June 6, 1967 G. C. LOCKWOOD 3,324,306
SWITCH-OPERABLE BISTABLE MULTIVIBRATOR
UNAFFECTED BY CONTACT BOUNCE
Filed Feb. 20, 1961
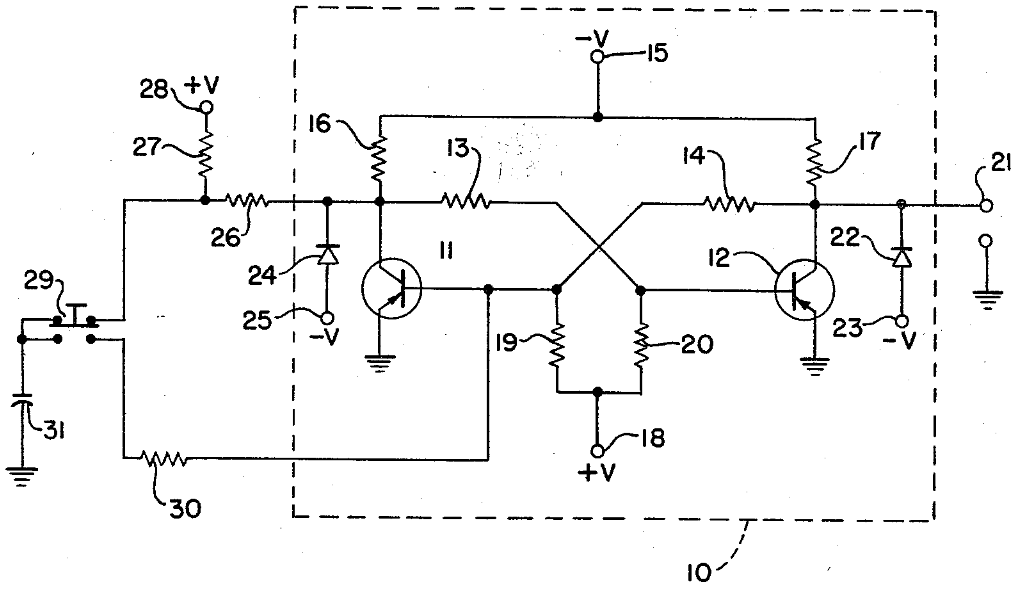
INVENTOR
GEORGE C. LOCKWOOD
BY Louis A. Kline
J. Haunder
HIS ATTORNEYS United States Patent Office 3,324,306
Patented June 6, 1967

3,324,306
SWITCH-OPERABLE BISTABLE MULTIVIBRATOR UNAFFECTED BY CONTACT BOUNCE

George C. Lockwood, Dayton, Ohio, assignor to The National Cash Register Company, Dayton, Ohio, a corporation of Maryland Filed Feb. 20, 1961, Ser. No. 90,321
4 Claims. (Cl. 307—88.5)

The present invention relates generally to bistatble devices and more particularly relates to a novel circuit arrangement for triggering a bistable multivibrator from one operational state to another.

It is well known that a bistable multivibrator is capable of being alternately triggered from one stable state of operation to the other by selective application of triggering impulses to the input circuit thereof. A multivibrator of this type is also known as an Eccles-Jordan trigger, or, more commonly, as a flip-flop. A circuit of this type is not only used as a square-wave generator which is adapted to be triggered by input signals of the impulse type, but is also extensively used for the performance of certain digital operations such as counting and information storage.

It is an object of the present invention to devise a novel circuit arrangement for triggering a bistable multivibrator.

Another object of the present invention is to devise a novel switch-triggerable bistable multivibrator.

Still another object of the present invention is to devise a new and improved bistable multivibrator which is of comparatively simple circuit configuration and is readily adaptable to be utilized as the input stage of a manually actuatable binary counter of the electronic type.

A further object of the present invention is to devise such a novel switch-operable bistable multivibrator whose mode of operation is completely unaffected by switch contact bounce.

In accordance with the present invention, there is provided a bistable multivibrator which is adapted to be triggered to a first operational state in response to an input signal of a first type and is adapted to be triggered to the opposite operational state in response to a subsequent input signal of a second type. Further provided is suitable means for generating a signal of the first type when the multivibrator is in the so-called opposite operational state and also for generating a signal of the second type when the multivibrator is in the first operational state. Finally, suitable switching means is provided which is operable in a first direction for effecting storage in a signal storage device of the signal generated by the generating means, and is operable in a second direction for applying to the input circuit of the multivibrator the signal previously stored in the storage device. As a result, the operational state of the multivibrator is reversed each time the switching means is operated in the second direction.

The features of the present invention which are believed to be novel are set forth with particularity in the appended claims. The organization and manner of operation of the invention, together with further objects and advantages thereof, may best be understood by reference to the following description taken in connection with the accompanying drawing.

In the drawing, reference numeral 10 refers to a bistable multivibrator of somewhat conventional circuit configuration in that a pair of amplifiers is utilized with the output circuit of each cross-coupled to the input circuit of the other such that an input signal of a first type causes the multivibrator to be triggered to a first operational state, and a subsequently applied input signal of a second type causes the multivibrator to be triggered back to the original operational state. More specifically, multivibrator 10 comprises a pair of transistor type of signal translating devices 11 and 12 with each being connected in a grounded-emitter circuit configuration. The collector output electrode of transistor 11 is coupled through resistor 13 to the base input electrode of transistor 12, whereas, the collector output electrode of transistor 12 is coupled to the base input electrode of transistor 11 through resistor 14 connected therebetween. The collectors of transistors 11 and 12 are each returned to bias terminal 15 through a respective one of dropping resistors 16 and 17. The base electrodes thereof are each returned to bias terminal 18 through a respective one of dropping resistors 19 and 20. Bias terminal 15 is adapted to be supplied with a suitable unidirectional operating current of negative polarity, whereas, bias terminal 18 is adapted to be supplied with a suitable unidirectional operating current of positive polarity. The collector of transistor 12 is connected to output terminal 21 and is also connected to the cathode of crystal diode 22 whose anode is connected to bias terminal 23. Also, the collector of transistor 11 is connected to the cathode of crystal diode 24 whose anode is connected to bias terminal 25. Bias terminals 23 and 25 are each adapted to be supplied with a suitable negative clamping potential in order to limit the maximum negative collector voltages of transistors 11 and 12 for reasons well known to those skilled in the art.

The mode of operation of the just-described portion of the novel multivibrator is as follows: Since the two transistors are cross-coupled, only one is permitted to be conductive at any given instance. Consequently, when one transistor is conducting, the other is cut-off, and vice versa. Thus, if it is assumed that transistor 11 is cut-off and transistor 12 is conducting, the potential at the collector of transistor 11 is substantially equal in magnitude to the negative clamping potential applied to terminal 25. However, the potential at the collector of transistor 12, hence the potential at output terminal 21, is substantially zero. The just described condition exists until the base of transistor 11 is subsequently driven negatively, at which time transistor 11 is rendered conductive in a well known manner. With transistor 11 now assumed to have been rendered conductive, the collector voltage thereof is substantially zero and, accordingly, the base input to transistor 12 is substantially reduced to ground potential. All of which results in transistor 12 being cut-off such that the potential at output terminal 21 is substantially equal to the magnitude of the negative clamping potential supplied to terminal 23. The just described condition exists until the base of transistor 11 is subsequently rendered positive, at which time transistor 11 is rendered conductive and transistor 12 is thereby cut-off.

It is therefore evident that a succession of alternating polarity impulses applied to the base of transistor 11 causes successive reversals-of-state of multivibrator 10, the number of such reversals-of-state of the multivibrator being equal to the number of input impulses applied to the base of transistor 11.

In accordance with the present invention, resistors 26 and 27 are serially connected between the collector of transistor 11 and terminal 28 which is adapted to be connected to a positive source of reference potential (not shown). The junction of resistors 26 and 27 is connected to the upper right-hand terminal of push-button switch 29. The lower right-hand terminal of switch 29 is coupled to the base of transistor 11 through dropping resistor 30, whereas, the remaining terminals of switch 29 are connected together and returned to ground potential through charging condenser 31.

The values of resistors 26 and 27, in addition to the value of the reference potential applied to terminal 28, are preferably chosen such that the potential at the junction of resistors 26 and 27 is ±3 volts, depending upon whether the output of the multivibrator is negative or zero, respectively. Thus, in a sense, the collector potential of transistor 11 is effectively translated with respect to the reference potential applied to bias terminal 28 in order ot produce at the junction of resistors 26 and 27 a suitable signal which is indicative of the then existing operational state of the multivibrator. For example, when the multivibrator is in an operational state such that the potential at output terminal 21 is zero, the value of the potential at the intersection of resistors 26 and 27 is substantially equal to −3 volts. However, when the multivibrator is in the opposite operational state, the value of the potential at the intersection of resistors 26 and 27 is substantially equal to +3 volts.

If it is now assumed that the multivibrator is in an operational state such that the output at terminal 21 is negative and, accordingly, the potential at the junction of resistors 26 and 27 is substantially equal to +3 volts, with the push-button actuator of switch 29 in the position shown, capacitor 31 is charged to a potential approximately +3 volts. Thereafter, a depression of the switch actuator causes the positive signal potential stored in capacitor 31 to be applied to the base of transistor 11. As before described, this causes transistor 11 to be cut-off and transistor 12 to be rendered conductive. As the potential at the junction of resistors 26 and 27 is now assumed to be −3 volts, rather than +3 volts as before, a release of the switch actuator causes capacitor 31 to be charged negatively to a potential of approximately −3 volts after the actuator returns to home position as shown. Thus, when the switch actuator is again depressed, the negative signal potential stored in capacitor 31 is applied to the base of transistor 11. As a result, transistor 11 is caused to become conductive and transistor 12 is caused to be cut-off. Upon release and subsequent return of the switch actuator, capacitor 31 is charged positively to a potential of approximately +3 volts and is thereafter ready for the next depression of the switch actuator.

It is therefore evident that in accordance with the present invention there has been devised a novel circuit arrangement which is characterized by extreme simplicity and yet is highly effective in causing the operational state of the multivibrator to be reversed each time the switch actuator is manually depressed. Due to the fact that it is possible to generate only unipolarity signal impulses even during erratic or spasmotic depression of the switch plunger, which normally causes "bouncing" of the switch contacts, the multivibrator experiences but one reversal-of-state for each depression of the switch plunger, regardless of whether the depression was erratic, spasmotic or otherwise. It is also evident that the circuit functions admirably well as a single stage binary counter which counts binarily the depressions of the switch actuator. By connecting one or more multivibrators in tandem thereto, the range of the binary counter is, of course, extended.

While not intending to limit the scope of the invention, exemplary component constants are shown in the following tabulation for illustrative purposes only:

| | | |
|---|---|---|
| Resistors **16** and **17** | ohms | 1K |
| Resistors **13** and **14** | do | 2K |
| Resistors **19**, **20** and **26** | do | 10K |
| Resistor **27** | do | 30K |
| Resistor **30** | do | 240 |
| Bias at terminals **18** and **28** | volts | +12 |
| Bias at terminal **15** | do | −20 |
| Bias at terminals **23** and **25** | do | −8 |
| Capacitor **31** | μf | .10 |
| Transistors **11** and **12** (PNP) | | 2N404 |
| Diodes **22** and **24** | | 1N34 |

Even though the invention has been described in detail with reference to a particular embodiment thereof, it is recognized that numerous changes may be made by one skilled in the art without departing from the invention in its broader aspects. For example, transistors 11 and 12 may be of the NPN variety by effecting suitable reversals of polarities of the potentials applied to the various bias terminals. In addition, fewer or a greater number of amplifying stages may be utilized with equal success in constructing a bistable multivibrator having the desirable features provided by the present invention. It is, therefore, the aim in the copended claims to cover all such equivalent variations as come within the true spirit and scope of the foregoing disclosure.

The invention having thus been fully disclosed, what is claimed is:

1. In combination:

a bistable triggering circuit having an input terminal and adapted to be triggered to one stable state only in response to a positive polarity triggering signal applied to said input terminal and to be triggered to the opposite stable state only in response to a negative polarity triggering signal applied to said input terminal;

generating means coupled to said triggering circuit and responsive to the condition thereof for generating a triggering signal of negative polarity in response to said triggering circuit being in said one stable state and for generating a triggering signal of positive polarity in response to said triggering circuit being in said opposite stable state;

a storage capacitor;

a first manually operable switching means serially connected between said generating means and said capacitor and operable for effecting the storage in said capacitor of the triggering signal generated by said generating means;

a second manually operable switching means serially connected between said input terminal and said capacitor and operable to effect the application to said input terminal of the triggering signal previously stored in said capacitor;

and means for alternately operating said first and second switching means whereby the triggering signal generated by said generating means is first stored in said capacitor each time said first switching means is operated and is subsequently applied to said input terminal to effect a reversal of state of said triggering circuit each time said second switching means is operated.

2. In combination:

a bistable triggering circuit having an input terminal and adapted to be triggered to one stable state only in response to an input triggering signal of one polarity applied to said input terminal and to be triggered to the opposite stable state only in response to an input triggering signal of the opposite polarity applied to said input terminal;

signal generating means coupled to said triggering circuit and responsive to the condition thereof for generating a triggering signal of said opposite polarity in response to said triggering circuit being in said one stable state and for generatng a triggering signal of said one polarity in response to said triggering circuit being in said opposite stable state;

signal storage means;

a first manually operable switching means serially connected between said generating means and said storage means and operable for effecting storage in said storage means of the triggering signal generated by said generating means;

a second manually operable switching means serially connected between said input terminal and said storage means and operable to effect the application to said input terminal of the triggering signal previously stored in said storage means;

and means for alternately operating said first and second switching means whereby the triggering signal generated by said generating means is first stored in said storage means each time said first switching means is operated and is subsequently applied to said input terminal to effect a reversal of state of said triggering circuit each time said second switching means is operated.

3. The combination in accordance with claim 2 in which said triggering circuit is a bistable multivibrator comprising a pair of cross-coupled amplifiers.

4. The combination in accordance with claim 2 in which said generating means comprises a voltage divider network connected between said triggering circuit and a source of reference potential.

References Cited

UNITED STATES PATENTS

| | | | |
|---|---|---|---|
| 1,980,146 | 11/1934 | Vingerhoets. | |
| 2,071,773 | 2/1937 | Sidney. | |
| 2,550,715 | 5/1951 | Norton. | |
| 2,997,665 | 8/1961 | Sylvan | 328—206 |
| 3,001,138 | 9/1961 | Jacobs et al. | |
| 3,089,964 | 5/1963 | Bruce et al. | |

OTHER REFERENCES

"Electronics Dictionary," Cooke and Markus, McGraw-Hill Co., 1945, p. 94.

"International Dictionary of Physics and Electronics," Van Nostrand Co., Inc., 1956, pp. 345–6.

ARTHUR GAUSS, *Primary Examiner.*

JOHN W. HUCKERT, *Examiner.*

HERMAN KARL SAALBACH, J. JORDAN, *Assistant Examiners.*